United States Patent [19]

Lundeby

[11] Patent Number: 5,611,044
[45] Date of Patent: Mar. 11, 1997

[54] SYSTEM AND METHOD FOR CROSS-TRIGGERING A SOFTWARE LOGIC ANALYZER AND A HARDWARE ANALYZER

[75] Inventor: Bruce A. Lundeby, Fort Collins, Colo.

[73] Assignee: Hewlett-Packard Company, Palo Alto, Calif.

[21] Appl. No.: 419,651

[22] Filed: Apr. 10, 1995

Related U.S. Application Data

[63] Continuation-in-part of Ser. No. 146,332, Nov. 1, 1993, abandoned.

[51] Int. Cl.6 .................................................. G06F 11/00
[52] U.S. Cl. .................................................. 395/183.14
[58] Field of Search ........................... 395/183.04, 700, 395/183.01, 184.01, 183.15, 183.14, 183.13

[56] References Cited

U.S. PATENT DOCUMENTS 5,265,254  11/1993  Blasliak et al. ........................ 395/700

OTHER PUBLICATIONS

AT&T Unix System V/386 Release 3.2 Programmer's Guide, Vol. II, Prentice–Hall, 1989, at 18–29.
AT&T Unix System V/386 Release 3.2 Programmer's Reference Manual, Prentice–Hall, 1989, at prof(5), 1 prof (1).

*Primary Examiner*—Robert W. Beausoliel, Jr.
*Assistant Examiner*—Norman M. Wright
*Attorney, Agent, or Firm*—Patrick J. Murphy

[57] ABSTRACT

A system and method provides software logic analysis of computer system problems. The system and method incorporates event triggering, event limiting and cross-triggering in a software event logging process. A cross-trigger port is provided to facilitate connection between the present system and an external analyzer, such as a hardware logic analyzer or an oscilloscope. An end-user controls the event logging process via a user interface that permits the end-user to write trigger and limit conditions. One embodiment of the present system and method involves the small computer system interface (SCSI) sub-system.

14 Claims, 9 Drawing Sheets

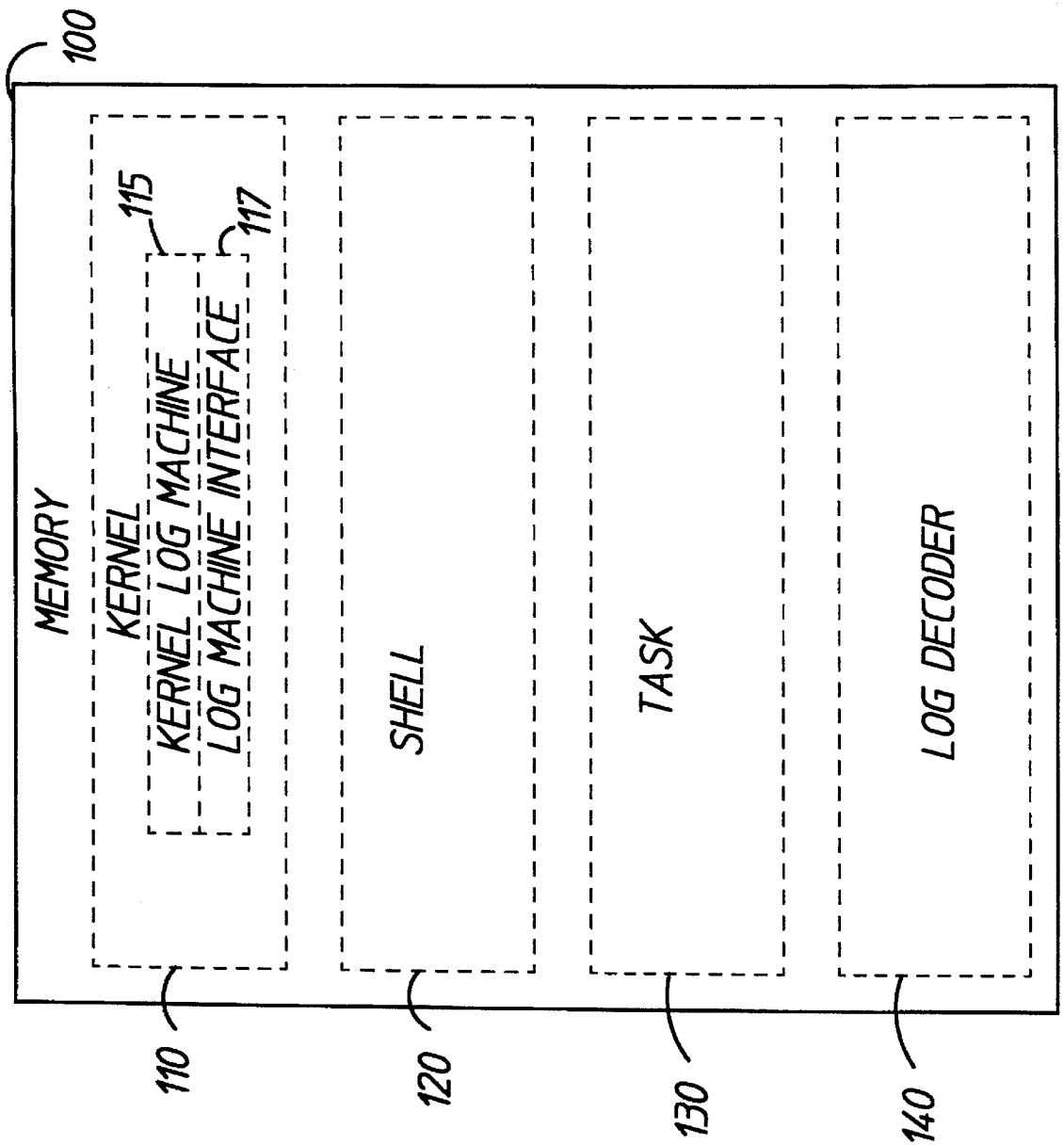

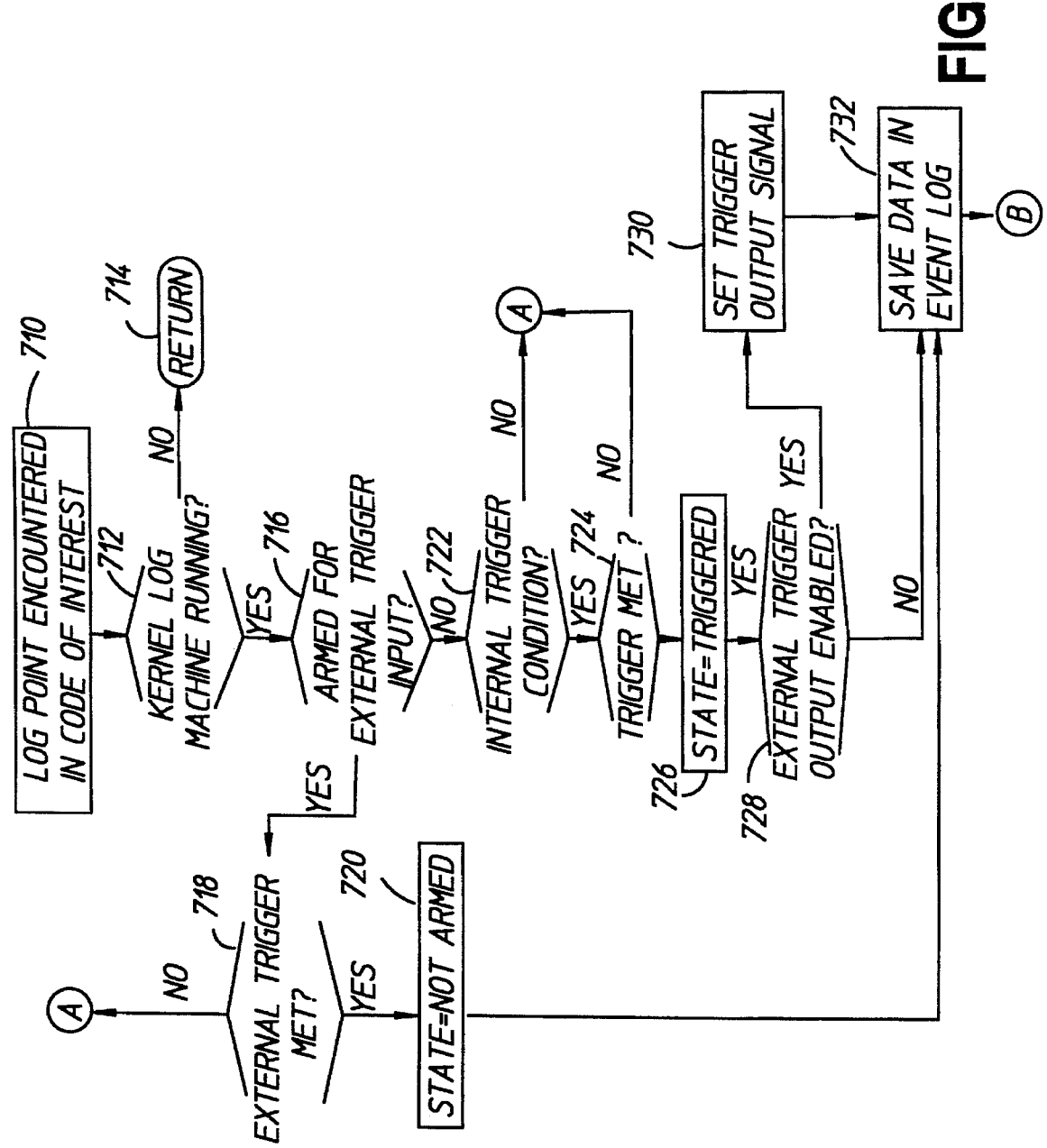

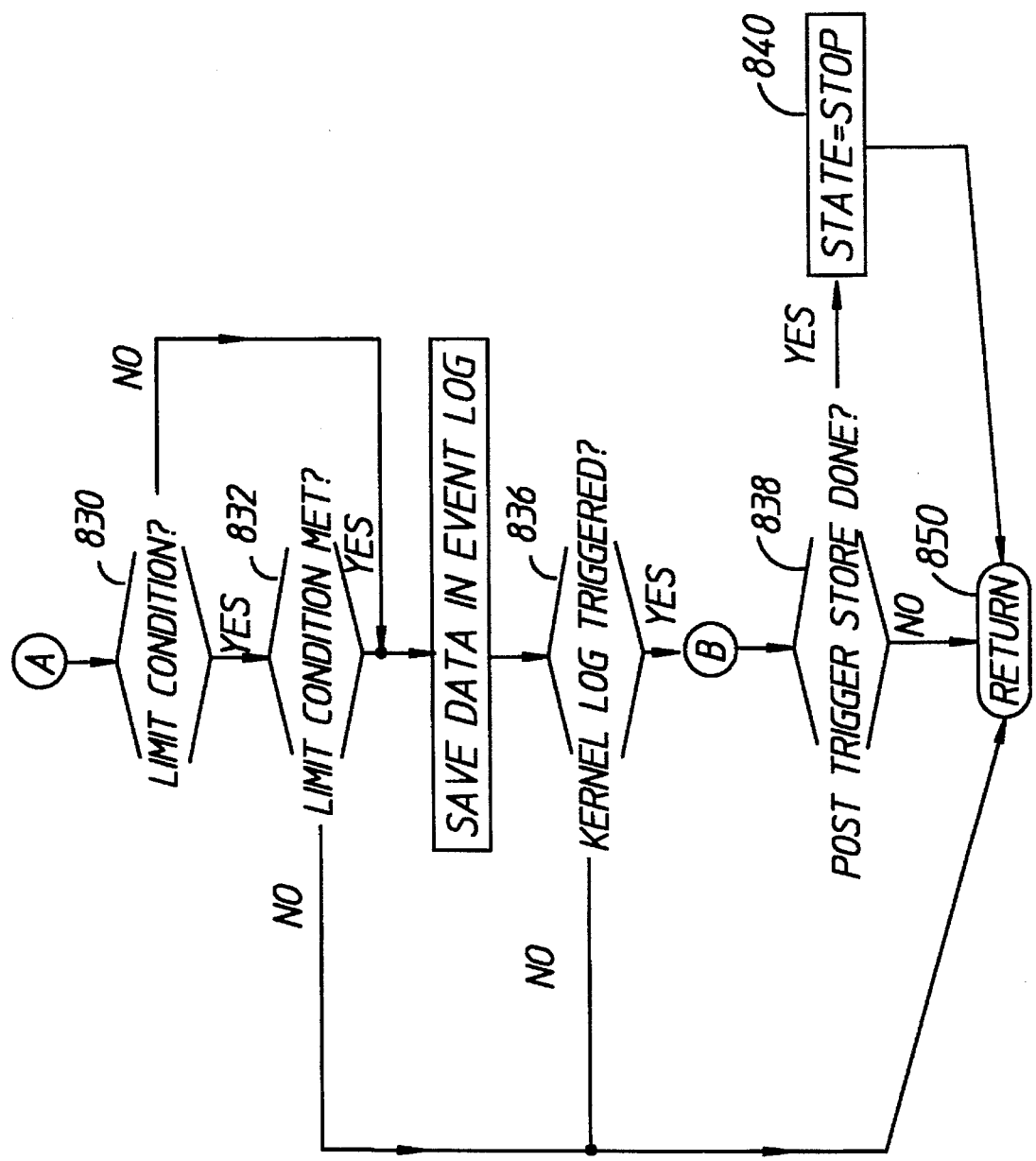

SYSTEM AND METHOD FOR CROSS-TRIGGERING A SOFTWARE LOGIC ANALYZER AND A HARDWARE ANALYZER

CROSS REFERENCE TO RELATED APPLICATION

This is a continuation-in-part of U.S. patent application Ser. No. 08/146,332 filed on Nov. 1, 1993, now abandoned.

FIELD OF THE INVENTION

The present invention relates generally to computer systems and more particularly to a system and method for logical analysis of software and hardware integration problems using a software logic analyzer with cross-triggering capabilities.

BACKGROUND OF THE INVENTION

Computer Operating System

Broadly, a computer operating system controls the activities of a computer. An operating system can be viewed as a very large computer software program that controls resource allocation scheduling, data management and input/output control. One aspect of an operating system is that it provides localized support for software/hardware integration so that individual applications need not be concerned with controlling hardware. One such operating system is HP-UX, an operating system which is manufactured by and made available from Hewlett-Packard Company, California, USA.

The structure of HP-UX can be broken down into two levels. At the core of HP-UX is the kernel. The kernel controls the hardware, schedules tasks and manages data storage. The kernel is "on" (i.e., running) at all times the computer system is on. The kernel is typically shielded from the end-user.

The next level of the HP-UX operating system is known as the user level. Located within this user level is a shell which acts as an interface between the end-user and the kernel. Typically, the shell interprets commands entered by an end-user and translates these commands into a machine language which the kernel understands. The primary task of the shell is to launch other user programs (i.e., call and execute programs from memory). Tools and applications are also located in this second level of the HP-UX operating system. Examples of applications include word processors, data management programs, computer graphic packages and financial spreadsheets.

One of the features of HP-UX is its ability to interact with hardware and hardware interface systems. Typical computer systems comprise a processing unit, memory units, a system bus, and a number of input/output (I/O) interface units. The I/O interfaces control data communications between the processing unit and the outside world, including the user and various peripheral devices.

The kernel of HP-UX contains kernel device drivers which, when configured, permit communication with and control of hardware devices, I/O cards located in the backplane of the computer, and other device drivers (e.g., network layers). Included among these device drivers are drivers for an HP-IB disk controller, magnetic tape drives, mass storage devices, and SCSI direct access storage devices. Typically, the structure of a device driver corresponds to the structure of the I/O hardware the driver is controlling. For example, a small computer system interface (SCSI) disk and tape device connected to a SCSI interface card installed on an EISA computer bus requires the following drivers and/or modules: general I/O services; EISA I/O services; general SCSI services; EISA SCSI interface card driver; SCSI disk driver; and a SCSI tape driver.

Analyzing Hardware Integration Problems

The complexity of the HP-UX operating system, particularly that portion which supports software/hardware integration, increases the probability of integration errors. This is compounded when the inherently peculiar problems associated with controlling the behavior of hardware are considered. One of the primary tasks of the kernel integration engineer is to analyze computer system operation to determine whether the operating system is performing as desired, and if an error is encountered, conduct a debugging process in order to correlate source code execution with the particular error. In the case of device drivers, the process of discovering and diagnosing problems is difficult because drivers are designed to "hide" the problems (e.g., auto-retry functionality). When a problem occurs in a driver, an important first step is to determine the software control flow and to correlate hardware behavior with software behavior, or hardware state to software state.

The primary tools used by kernel integration engineers in debugging integration problems are hardware logic analyzers, software debuggers and rudimentary event logging. Hardware logic analyzers provide the capability to monitor logical activity at the external terminals of a digital system (i.e., I/O busses). The logic analyzer is an oscilloscope-type instrument having dozens of channels, large memory and the ability to disassemble/decode bus states and phases. Typically, a logic analyzer is electrically coupled to a particular hardware interface and, while stepping through a process, the analyzer captures data. One problem with present hardware logic analyzers is that they capture data at a very low level of detail. Thus, it is often difficult to collect a sufficient amount of this low-level-detailed analyzer data to be correlated with source code execution to pinpoint root cause analysis information. This is particularly true for complex input/output protocols such as SCSI. Another disadvantage of the hardware logic analyzer is the high cost of the analyzer.

Software debuggers are programs which aid the kernel integration engineer by providing breakpoints in code execution and dump routines. Typically, software debuggers disassemble, decode and/or interpret code. They also allow variables to be examined so that the values of these variables and the like may be checked against expected values. While debuggers provide a good correlation between analysis data and source code, they are extremely invasive, resulting in decreased real-time execution timing and speed. Thus, hardware integration problems often will not manifest themselves while the code is being debugged.

A third tool available to kernel integration engineers is simple event logging. This process involves adding explicit event log points to the source code in order to store useful software state and path flow information. During code execution, event data is accumulated in an event log which holds data for the last N events. One problem with this scheme is that the appropriate size of the event log is difficult to determine. Typically, the log is a circular buffer; hence as the N+1 event is logged, the first event is pushed out. Increasing the size of the event log consumes memory. Decreasing the event log may result in critical data being pushed out of the log. Another problem with simple event logging is determining the number of log points. Selecting too many log points is invasive and will slow down the software. This also leads to the possibility of pushing important data out of the log. Selecting too few log points may result in missing critical dam. Multi-tasking systems with re-entrant drivers introduce another problem: events resulting from control of different hardware in multi-tasking systems with re-entrant drivers will often push out critical data previously logged.

SUMMARY OF THE INVENTION

The present invention provides a system and method for analyzing software problems by providing cross-triggering capabilities in a software logic analyzer. The present method incorporates hardware logic analyzer concepts such as event limiting, event triggering and cross-triggering via a user program interface into an event log process. In addition to limiting and triggering, the event log process utilizes symbolic decoding to ensure important log information is captured with minimal memory space.

A portion of the present method resides in the kernel of the operating system. This kernel log machine collects predetermined events identified by a kernel engineer. Event limiting and event triggering are additional capabilities provided to more efficiently use the event log buffer by storing only relevant events. A cross-triggering capability is also provided to facilitate simultaneous use of multiple analysis tools for debugging particularly difficult problems. A cross-trigger port is provided into and out from the kernel log machine.

The cross-trigger port permits the software logic analyzer to be connected to other analysis tools, such as hardware logic analyzers, oscilloscopes and other software logic analyzers. The cross-trigger port is bi-directional and can be created by using an I/O signal path from one of the I/O interfaces of the system comprising the kernel. The cross-triggering capability is non-invasive due to the synchronous nature of event logging: trigger input ports can be simply polled when events are logged and trigger output ports can be simply written to when the kernel log machine changes states.

Another portion of the present method resides outside the kernel of the operating system. This portion includes a log interface and log decoder. The log interface permits the kernel engineer to provide event limits and triggers. The log decoder converts the event log to a more readable format.

A preferred embodiment of the present method involves the small computer system interface (SCSI) subsystem. SCSI subsystem logging provides a valuable tool to analyze hardware integration problems. Explicit log points are added to the source code during system development. Critical log information (e.g., including time, device, source file, source line, functional sub-part, parameter name, parameter value and comments) is encoded into 16 bytes. The log decoder capability is provided to transform the log information into an easily readable format.

BRIEF DESCRIPTION OF THE DRAWINGS

FIGS. 1a–b, shows a block diagram of a computer memory system incorporating the present invention.

FIG. 7 shows a flow diagram of the kernel log machine according to the present invention.

FIG. 8 is a continuation of FIG. 7.

DETAILED DESCRIPTION OF THE PREFERRED EMBODIMENT

The present invention is a system and method for analyzing software problems by providing enhanced capabilities in a software logic analyzer. By incorporating hardware logic analyzer techniques in a software event logging capability, dramatic improvement in event logging can be achieved. Specifically, event limiting and triggering techniques are employed to provide a more effective and efficient logging function. A cross-triggering capability is also provided via a cross trigger port into and out from a kernel log machine. These added capabilities provide a kernel engineer with the ability to focus on the debugging process and achieve a closer correlation of hardware and software behavior.

The present invention provides a means to analyze a specific software process, known as the code of interest. A kernel engineer, or other end-user, can set predetermined trigger and limit conditions via a user-interface located within a user process of an operating system. These predetermined conditions act as a filter for the explicit log points placed within the code of interest prior to initializing the logging function. A capture and decoding facility is provided to transform the event log into a more readable decoded report.

Figure 1A:
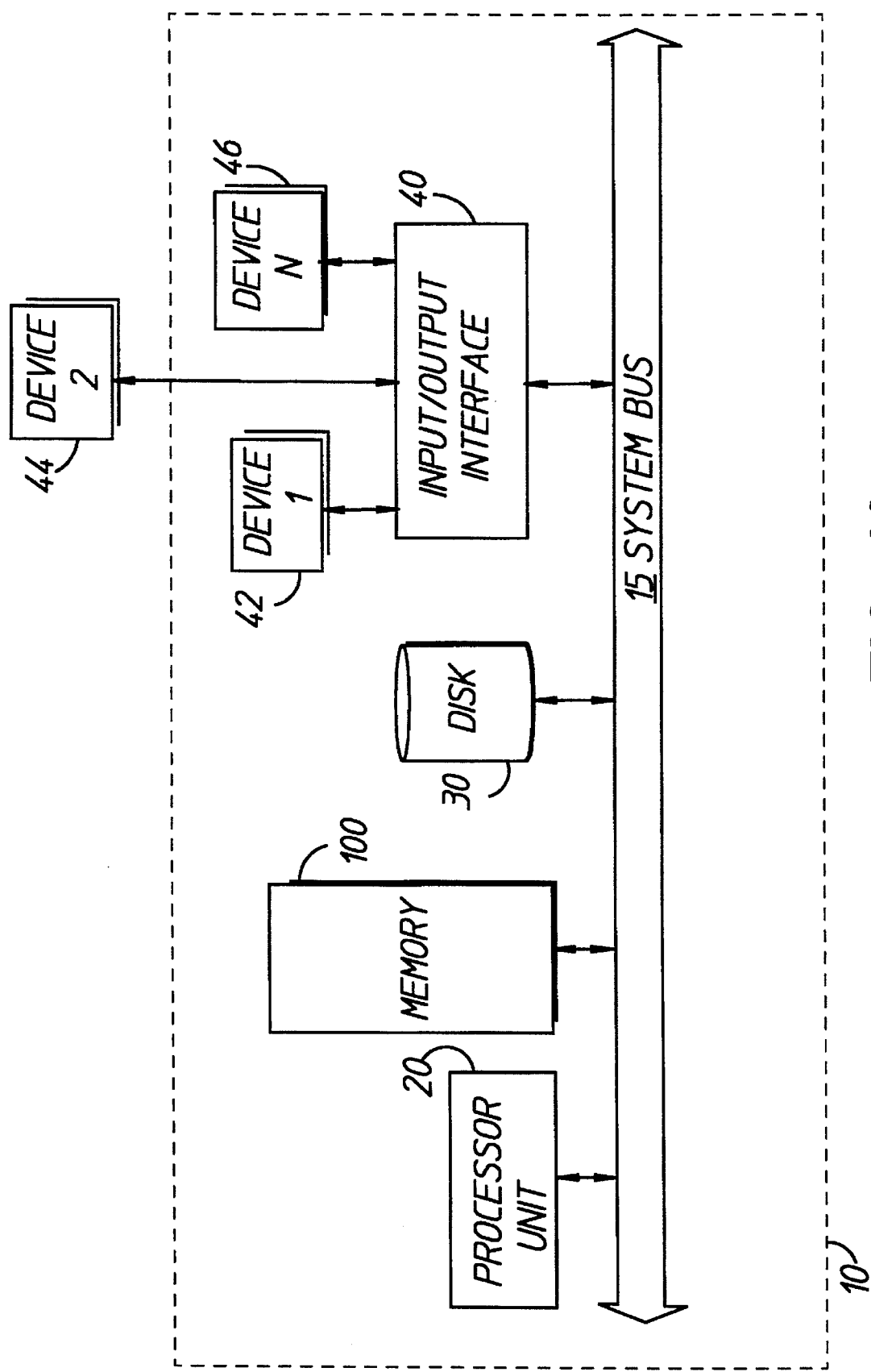

FIG. 1a shows a block diagram a general purpose digital computer system 10 incorporating the present invention. A processing unit 20 is connected to system bus 15. The system bus 15 facilitates communications between the processing unit 20 and a data storage disk 30 and an input/output (I/O) interface device 40. A memory 100, also connected to the system bus 15, stores the software of the present invention as well as all data collected and generated by the present invention. The input/output interface device 40 controls data communications between the bus 15 and various devices (e.g., device 1, device 2, and device N). For illustrative purposes, these devices may be a display mechanism 42, an analysis tool 44 and a keyboard 46. Any number of devices may be attached to the system 10 via the I/O interface 40, and these devices may be considered a integral part of the system 10, or a mechanism that can be attached to the system 10 from the outside, such as a printer or an analysis tool.

FIG. 1b shows a block diagram of the computer memory system incorporating the present invention. The memory unit 100 comprises a kernel 110, a shell 120, a task 130 and a log decoder 140. The kernel 110 and shell 120 form part of a multi-tasking operating system. In a preferred embodiment this operating system is HP-UX available from Hewlett-Packard Company, California, USA. The kernel 110 further comprises a kernel log machine 115 and a kernel log machine interface 117. The memory unit 100 can communicate with the remaining computer system using a computer bus (not shown). In a preferred embodiment the memory unit 100 is a random-access memory having at least 8 Megabytes (MB) of space.

Figure 2:
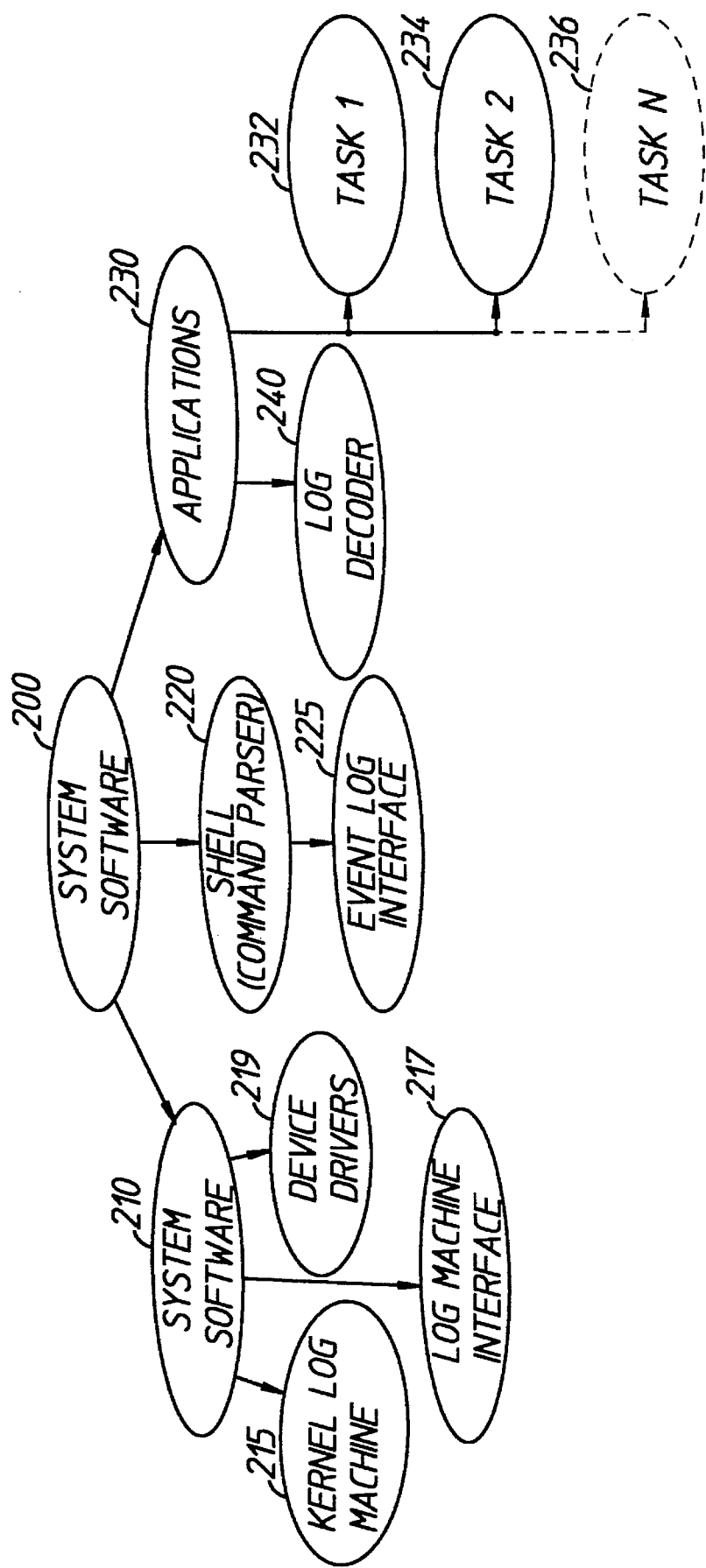
FIG. 2 shows an overview of the software of the present invention.

FIG. 2 shows an overview of the software of the present invention. The software in a computer system 200 comprises a kernel 210, a shell 220 and an applications process 230. The kernel 210 controls hardware interfaces and devices, schedules tasks and oversees data storage. To accomplish this, the kernel 210 further comprises a kernel log machine 215, a kernel log machine interface 217 and device drivers 219. The system software 200 performs other functions which are not part of the present invention.

The shell 220, also known as a command parser, provides an interface between an end-user and the kernel 210. Basically, the shell 220 is one of the many processes which runs on the system 200. The shell 220 is unique in that it collects command arguments from the end-user and launches other processes to execute those commands. An event log interface 225 is one of the processes which can be launched by the shell 220. The applications processes 230 comprise various end-user tools and applications such as a data management program, computer graphics package and financial spreadsheets. These are represented as tasks 1 through N (items 232, 234, 236) and can be launched by the shell 220. A log decoder 240 also resides within the applications processes 230.

Figure 3:
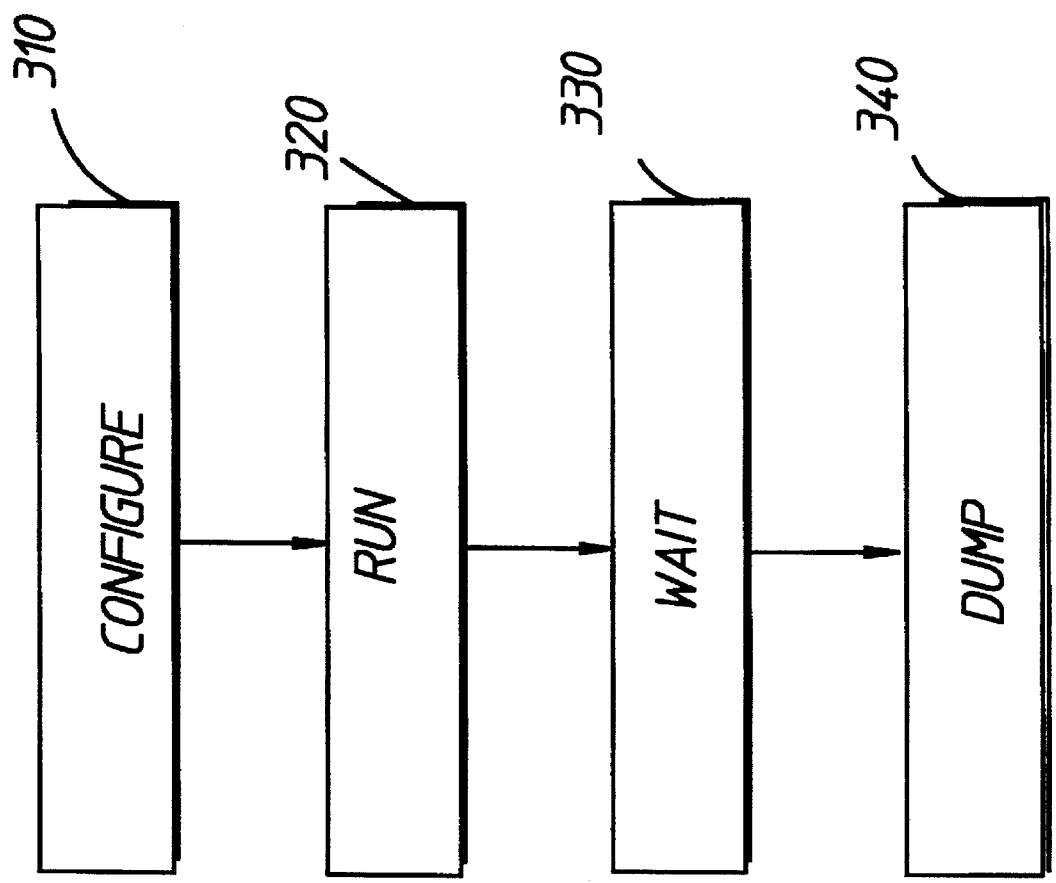
FIG. 3 shows a simplified flow chart of the overall flow of the present method for software logic analysis.

FIG. 3 shows a simplified flow chart of the overall flow of the event log interface for a commonly used analysis mode using the present method for software logic analysis. Due to the large number of commands available to the end-user (see Appendix A), a simplified flow chart is used to describe a typical overall method for software logic analysis. An end-user first configures 310 the log controller to capture events based upon predetermined conditions. Once the event log configuration is in place, the software logic analysis may begin 320. A wait 330 is inserted to allow the analyzer to continue processing until a predetermined condition is met, at which time the analyzer stops and the event log is dumped 340. Other modes can be used in conjunction with the present method without departing from the scope and spirit of the present invention. For example, a reconfigure step could be inserted after the wait 330. Multiple reconfigure-run-wait routines could also be utilized in this position.

Figure 4:
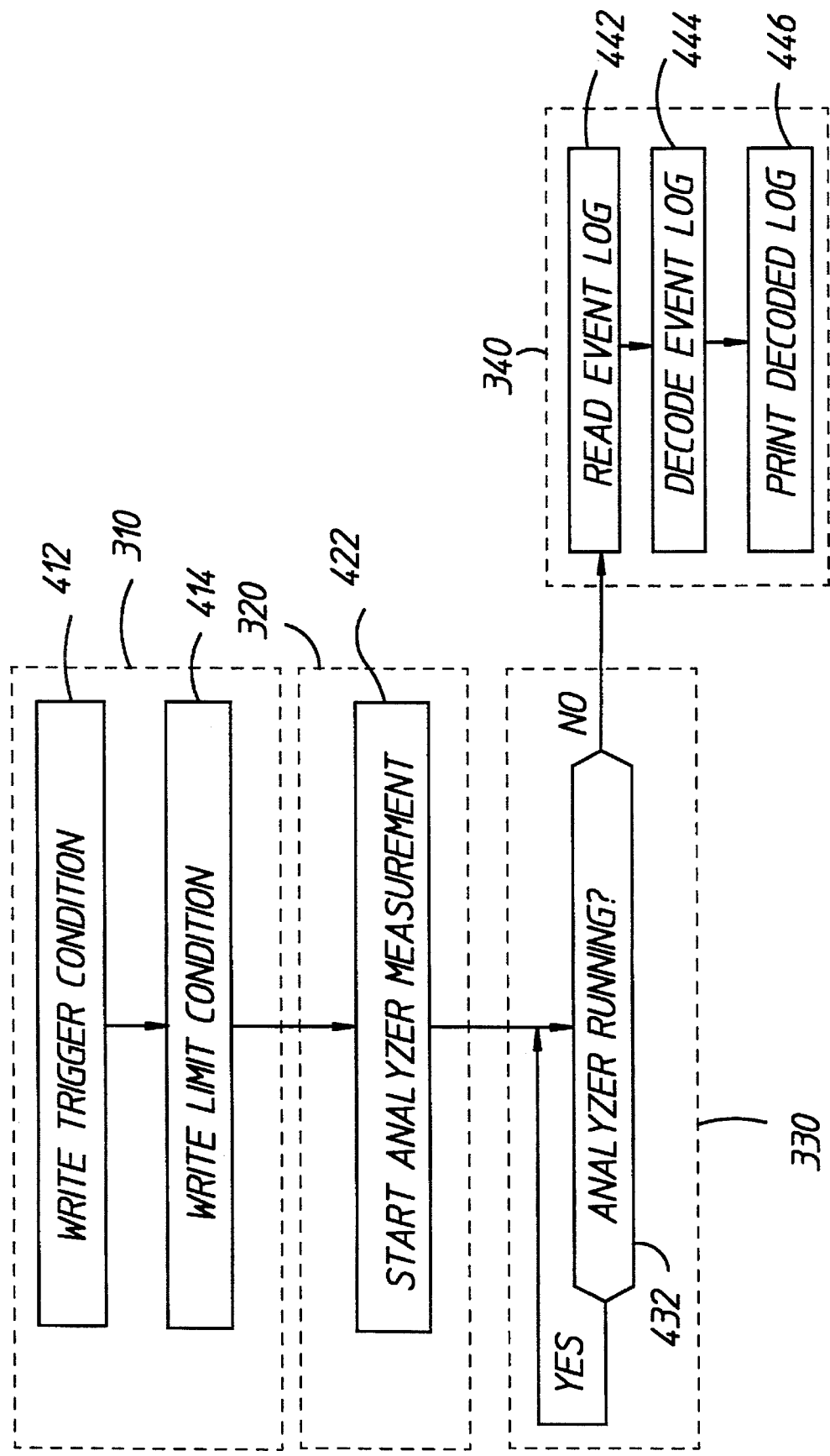
FIG. 4 shows a more detailed flow chart of the overall flow of the present method.

FIG. 4 shows a more detailed flow chart of the sample measurement presented in FIG. 3. Block 412 permits the end-user to write a trigger condition. A trigger condition can be some predetermined condition that, upon occurrence, halts the kernel log machine in the present method immediately or after some number of additional events. For example, a trigger condition can be set to halt logging events when a particular routine in the code of interest is called.

Block 414 permits the end-user to write a limit condition. Limit conditions act as filters to ensure that only log points which satisfy a predetermined condition are logged. For example, a limit condition can be set so that the kernel log machine only captures each instance of opening or closing of a device driver. Other trigger conditions and limit conditions are available and are listed in Appendix A. While it is often desirable to set trigger and limit conditions, the present method does not require that these conditions be written; event logging may occur without triggers or limits.

Once the trigger and limit conditions are set, block 422 commences analyzer measurements. This is simply the process of logging the predetermined log points selected by the end-user based upon the trigger and limit conditions (i.e., the kernel log machine is started). A wait state is inserted via block 432 which permits the analyzer to continue collecting the log points until a trigger condition is met or until the end-user halts the kernel log machine. After the kernel log machine stops, blocks 442, 444 and 446 read, decode and print the event log respectively.

Figure 5:
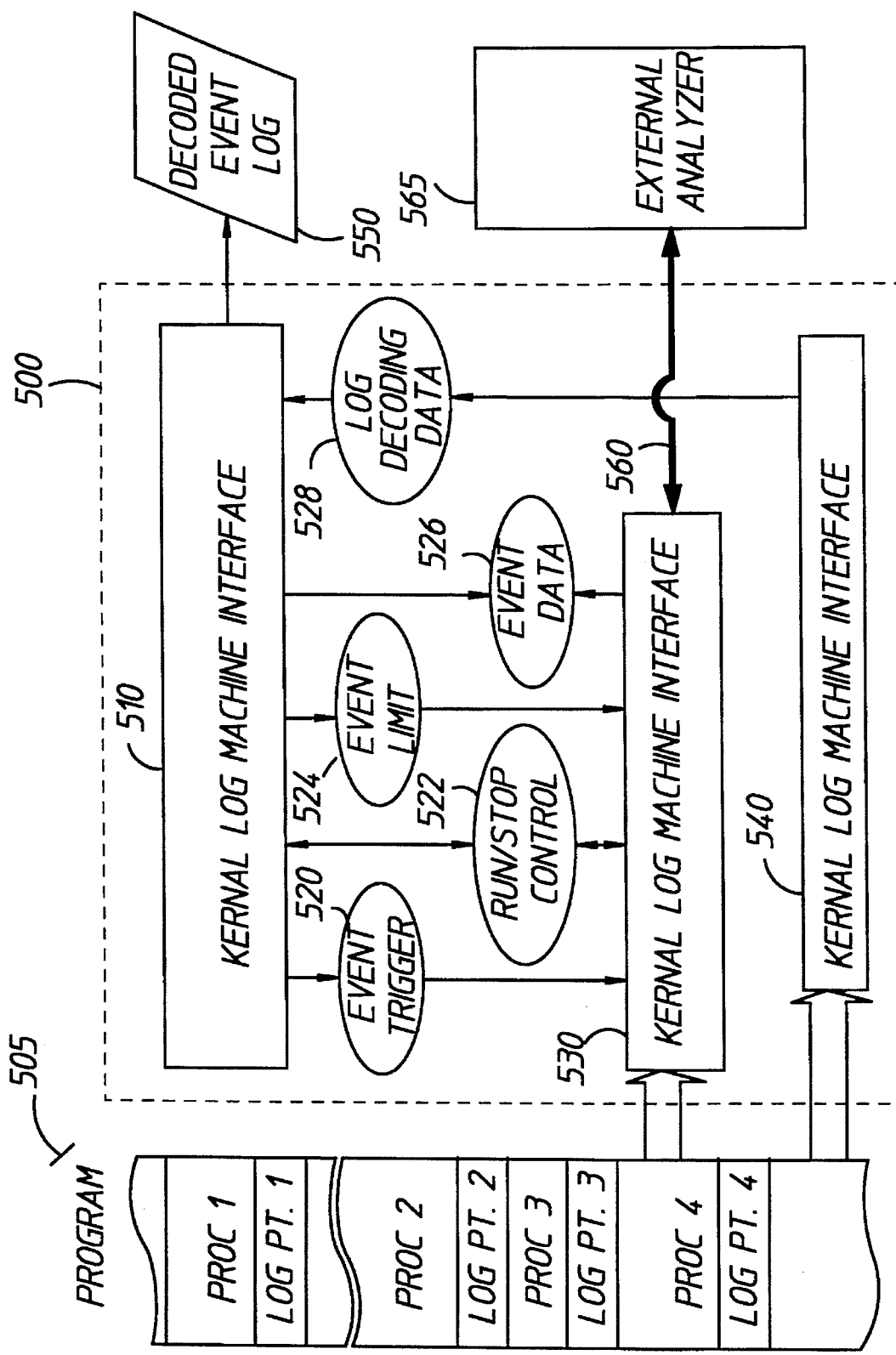
FIG. 5 shows a block diagram of the software logic analyzer.

FIG. 5 shows a block diagram of the software logic analyzer. The software logic analyzer 500 essentially incorporates hardware logic analyzer concepts into an event logging process. A program 505 contains a plurality of procedures (e.g., PROC 1 through PROC 4); program 505 is the code of interest. Inserted throughout the program 505 are explicit log points (e.g., LOG PT. 1 through LOG PT. 4). These log points may be placed anywhere the end-user deems necessary. Log points may be placed before or after a procedure, as well as within a procedure. A log point is a data value; generally, log points are simply values of process variables. An example of a log point is the tape head position of a tape driver. In a preferred embodiment, these log points are inserted during code development by a source code developer. This method is advantageous since the developer may preselect important analysis data and decoding information. In another preferred embodiment, the log points are automatically inserted by a preprocessing or compilation tool.

A kernel log machine interface 510 provides a capability to an end-user to control and decode the event log via a kernel log machine 530. Besides providing run/stop control 522 of the kernel log machine, the end-user may select a specified event trigger 520 which, upon occurrence of that condition, will disable event logging. An event limit 524 may be introduced which will cause only those events which satisfy the limit condition to be logged. Additionally, the kernel log machine interface 510 provides the end-user with the capability to decode the event log and format the printing. The kernel log machine 530 uses the trigger and limit conditions written by the end-user to collect the log points, or raw event data 526, for the event log. The operation of the kernel log machine is discussed more fully below with respect to FIGS. 7 and 8.

A log decoding data extraction process 540, in conjunction with log decoding data 528, will decode the event log into a readable format and output the decoded event log 550 to the display screen or to a memory location. A preferred embodiment of the log decoding data is listed in Appendix B.

A trigger port 560 is provided into the kernel log machine 530. The trigger port 560 permits the software logic analyzer 500 to more effectively participate in analysis configurations involving multiple tools. The trigger port 560 is bidirectional; that is, the trigger port 560 is both an input port and an output port. Connected to the trigger port 560 is an external analyzer 565. The external analyzer 565 may be a hardware logic analyzer, oscilloscope or any other test and measurement device. In a preferred embodiment, the external analyzer 565 is an HP B3740A software analyzer manufactured and made available by Hewlett-Packard Company, California, USA. In another preferred embodiment, the external analyzer 565 is an HP 546xxB series oscilloscope manufactured and made available by Hewlett-Packard Company, California, USA. Additionally, the external analyzer 565 may be another software logic analyzer located within a different digital computer system or a different I/O subsystem of the same digital computer system (item 10 in FIG. 1*a*).

In one preferred embodiment, the trigger port 560 can be implemented via any one of a plurality of I/O signal lines within the I/O interface (item 40 in FIG. 1*a*). For example, a SCSI software logic analyzer may use signal lines in a parallel or serial interface on the same system to provide a hardware trigger port 560. Additionally, a dedicated special-purpose trigger interface may be used. When the trigger port 560 is being used as a trigger input port, the external analyzer 565 may arm (i.e., start) or trigger (i.e., stop) the analyzer 500. When the trigger port 560 is being used as a trigger output port, the analyzer 500 can send a message to the external analyzer 565, the message being indicative of when the measurement is complete (i.e., the trigger condition has been met). Additionally, when the trigger port 560 is configured as an output port, the external analyzer 565 can download data from the I/O interface. In another preferred embodiment, the trigger port 560 can be implemented in either shared or global memory. In this embodiment, the external analyzer 565 is another software logic analyzer which may be located in another subsystem within the computer system (item 10 in FIG. 1a) or in a separate system.

Figure 6:
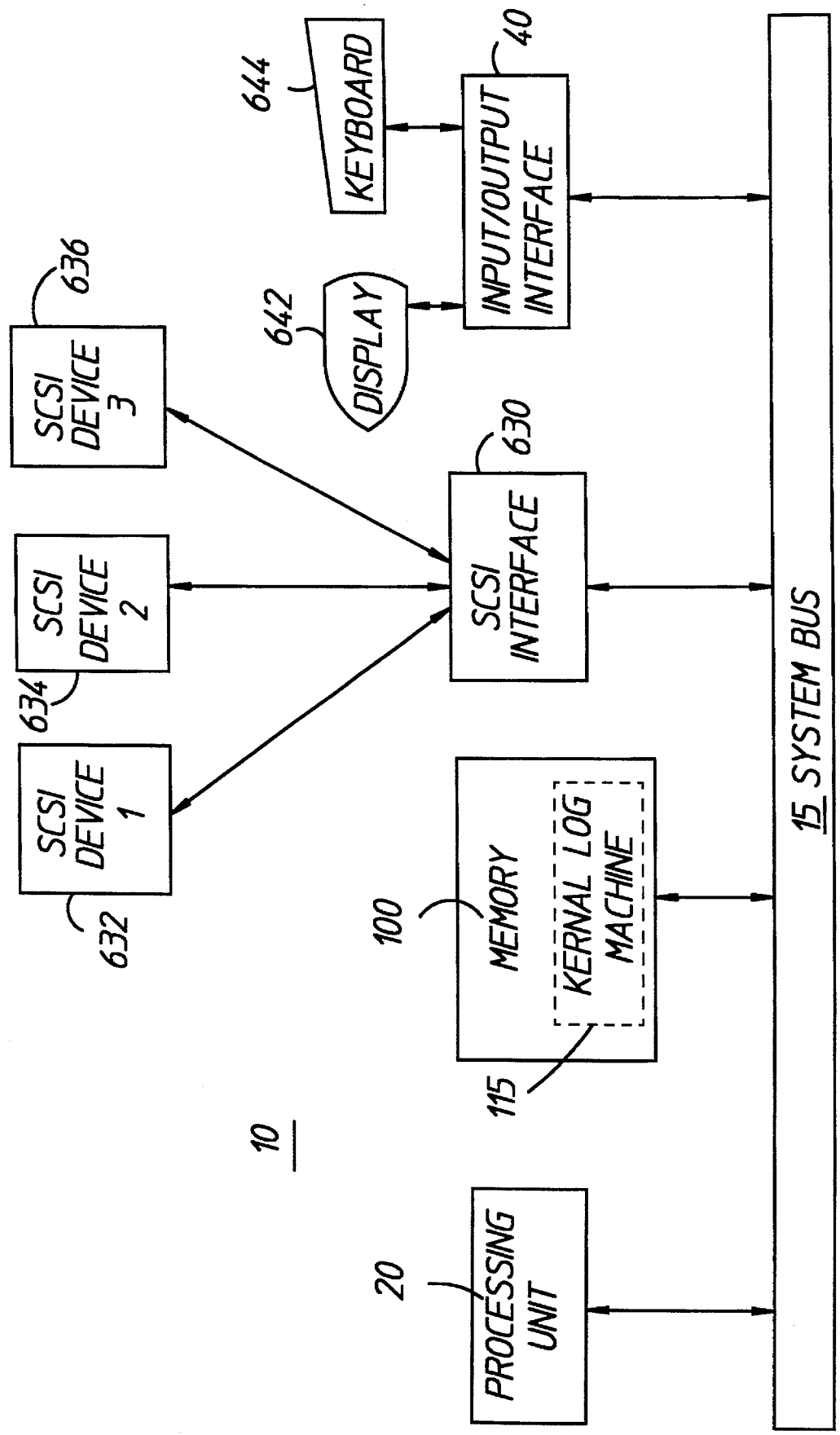
FIG. 6 shows a block diagram of a general purpose digital computer system incorporating the present invention.

FIG. 6 shows a preferred embodiment block diagram of the general purpose digital computer system of FIG. 1a. A small computer system interface (SCSI) interface 630 is connected to the system bus 15. The SCSI interface 630 connects a variety of SCSI devices (items 632, 634 and 636) to the system bus 605. One such device that can be connected to the system 10 via the SCSI interface 630 is a hardware logic analyzer; another such device is an oscilloscope. The SCSI interface 630 uses a byte-wide or a multibyte bi-directional parallel protocol with handshaking. In a preferred embodiment, program 505 (see FIG. 5) controls the SCSI interface 630.

FIGS. 7–8 show a flow diagram of the kernel log machine according to the present invention. Essentially, FIGS. 7–8 run in parallel to the wait process described with respect to block 330 in FIG. 3 and block 432 in FIG. 4. Block 710 initiates a call to the kernel log machine (item 530 in FIG. 5). When a log point is encountered in the code of interest, control is passed to decisional block 712 to determine whether the kernel log machine is running. If it is not running, control is returned 714 to the main program (i.e., the code of interest) to continue code execution. If the kernel log machine is running, control is passed to decisional block 716. Decisional block 716 determines whether the kernel log machine has set the STATE to 'ARMED' for the external trigger input (item 560 in FIG. 5). If the STATE is ARMED for the external analyzer, control is passed to decisional block 718 which determines whether the external trigger has been met. If the STATE is not ARMED, then control passes to decisional block 722.

Decisional block 722 determines whether an internal trigger condition is present and, if a condition is present (see item 412 in FIG. 4 and items 510, 520 in FIG. 5), control is passed to decisional block 724 to determine if the trigger condition has been satisfied. If no internal trigger condition has been written, or if the trigger condition has not yet been satisfied, control is passed through item A to enter the method in FIG. 8.

If the trigger condition has been satisfied, block 726 sets the state of the kernel log machine to "TRIGGERED." Control is then passed to decisional block 728 which determines whether the external trigger output has been enabled. If the output has been enabled, block 730 sets the trigger output signal before passing control to block 732. The trigger output signal is set to indicate a trigger condition depending on how the external logic analyzer is configured. Thus, the exact value to which the trigger output signal is set depends upon the trigger configuration. For example, the signal could be set to a high or low logic level. If the external trigger output is not enabled, control is passed to block 732 which saves the data in the event log before going to decisional block 838 (item B, FIG. 8).

Returning to decisional block 718, if the external trigger condition has been met, block 720 resets the STATE equal to 'NOT ARMED' before passing control to block 732 which saves the data in the event log. If the external trigger condition has not been met, control is passed to decisional block 830 (item A, FIG. 8).

Referring now to FIG. 8, decisional block 830 determines whether a limit condition is present (see item 414 in FIG. 4 and items 510, 524 in FIG. 5). If there is a limit condition present, then decisional block 832 determines whether the limit condition has been satisfied and, if the limit hasn't yet been satisfied, transfers control to block 850 to return to the code of interest. If the limit condition is satisfied, or if no limit condition was written, block 834 saves the data in the event log.

After the data is stored in the event log, decisional block 836 determines whether the kernel log machine is in a TRIGGERED state. A non-TRIGGERED state lets the kernel log machine to return 850 control to the code of interest. A TRIGGERED state brings the method to item B.

Decisional block 838 determines whether post-trigger events have been stored. Post-trigger events are a predetermined number of events to log after the trigger condition is met. This permits the end-user to examine events surrounding the trigger condition (i.e., just prior to and immediately following). If post-trigger events have not been or do not need to be stored, the method returns control to the code of interest (item 850). If the post-trigger events have been stored, block 840 resets the kernel log machine state to "STOP" before returning to the code of interest.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

APPENDIX A -- Event Logging Commands Including Trigger Condition
And Limit Condition Commands and Arguments

```
/*
 scsi_log 1M
NAME
        scsi_log \- control and dump SCSI event log

SYNOPSIS
        scsi_log [ -V ]
        scsi_log [ -h hpux_file ] [ -c core_file ] [ -f command_file ]... [ command ]...
        scsi_log [ -s save_file ] [ -f command_file ]... [ command ]...
        scsi_log [ -h hpux_file ] [ -i ] [ -f command_file ]... [ command ] ...
```

DESCRIPTION
Scsi_log is the interface for control and decoding of the system's SCSI event log. Information is logged at specific predetermined points throughout the SCSI I/O subsystem. SCSI event log information is most useful to the implementors which have created the log points. However, log information may also be useful for analysis of device related issues.

Scsi_log may be used for post-mortem analysis of the state of the SCSI I/O subsystem. In order to use scsi_log in this manner, you must arrange to get an image of the memory of the system (a core file) after the system crashes. This can be done through the use of savecore(1M). The resulting hp-ux and hp-core files should be specified using the -h and -c flag arguments.

Scsi_log may be used on a running system to gain access to the current state of the SCSI I/O subsystem. When used in this manner, scsi_log provides a logic-analyzer-like interface which can be used to limit the specific events to be logged and stop event logging when some trigger condition is met. Scsi_log operates in this manner by default.

Scsi_log may be used on a kernel executable file to examine or modify the initial operation of event logging in the SCSI I/O subsystem. This type of operation is most useful for analysis of system reboot via the SCSI I/O subsystem.

The -V flag causes the scsi_log version to be printed. Because scsi_log works very closely with the system kernel and contains very detailed information about the SCSI I/O subsystem, it is important for the scsi_log version and the system version to match. The system version may be determined by use of the uname(1m) command. Whenever scsi_log operates incorrectly or fails to completely decode log information, mismatched system and scsi_log versions should be suspected.

The -c option may used to specify the core file to be analyzed. By default, scsi_log accesses the SCSI log of the currently running system (via /dev/kmem). When accessing the SCSI event log contained in a core file, only status and log decoding commands may be used. The -h option may be used to specify the appropriate hpux file. Scsi_log obtains indexing (symbol table) information from the hpux file. By default, scsi_log gets indexing information from /hp-ux .

The -s option may be used to specify that log data should be taken from the indicated scsi_log save file instead of a core file. The save file should be the result of a save or running_save command executed with the same scsi_log version.

- 15 -

The -i flag is used to cause the initial operating parameters in the hpux file to be examined or modified. Changes to the hpux file will not take effect until system reboot. Note that hpux file access is considerably slower than other types of scsi_log use due to implementation. Because hpux file modifications require a system reboot to take effect, this additional time is not significant.

The -f option may be used to specify a scsi_log command file. This is particularly useful for complex command sequences which would require unmanageable scsi_log argument lines. Multiple -f options may be used to execute a series of command files.

The following commands may be used to control the operation of scsi_log :

| | |
|---|---|
| # | Indicates a comment. The comment is terminated by the end of the source line. Because end-of-line is somewhat ambiguous in the context of command line arguments, comments are only permitted in command files. |
| status | Decode and print the current event log status. The printed information includes a variety of information including the log state, and current limit and trigger conditions. |
| dump | Decode and print the current contents of the SCSI event log. The log fields printed, and their order, is controlled by the dump format. The dump format may be specified by use of the format command. |
| running_dump | Continuously decode and print the contents of the SCSI event log by reading and rereading system memory. If the event log rate exceeds the event dump rate, events may be lost. If events are lost, that fact will be noted in the dump. A running_dump operation will continue until logging is stopped. This happens when a log run is completed (the trigger condition has been met and sufficient events have been post-stored). If the trigger condition is not met or triggering is not enabled, this command will never terminate. | format = _format_value_
Print SCSI event log lines using the fields (and field order) indicated by format_value. A default dump format will be used if an explicit dump format is not provided with the format command. The default dump format may be set via the SCSI_LOG_FORMAT environment variable. A format_value is made up of the following letters:

| | |
|---|---|
| A | Absolute event time based on the trigger event or the first dumped event in an easily readable form. |
| C | Comment associated with the log point. Note that log point comments are optional and many log points do not have comments associated with them. |
| D | Device number in hexadecimal. |
| E | Absolute event number based on the first logged event. |
| F | The name of the source file containing the log point. |
| L | The line number in the source file of the log point. |
| M | Decoded meaning of parameter data value. |
| N | Relative event number based on the trigger event or the first dumped event. |
| P | Parameter name. |
| Q | Relative event time in a consistent, high-precision, numeric form. |
| R | The name of the subroutine containing the log point. |
| T | Relative event time in an easily readable form. |

- 16 -

| | | |
|---|---|---|
| | V | Parameter value in decimal form. |
| | X | Parameter value in hexadecimal form. |
| | Y | Absolute event time based on the trigger event or the first dumped event in a consistent, high-precision, numeric form. |
| | Z | The character @ to mark the trigger event (otherwise blank). | dump_limit = condition.
    Cause only events meeting the indicated condition to be printed by a dump or running_dump command. The condition must be either: NONE, ANY, or an event_specification as indicated below.

dump_unlimit    Disable the current dump limit condition. This causes all logged events to be printed by a dump or running_dump command.

save = file_name
    Record the current contents of the SCSI event log in the file indicated by file_name. The contents of this save file may be latter decoded using the scsi_log -s option.

running_save = file_name
    Continuously record the contents of the SCSI event log in the file indicated by file_name by reading and rereading system memory. If the event log rate exceeds the event dump rate, events may be lost. If events are lost, that fact will be noted in the save file. A running_save command will continue until logging is stopped. This happens when a log run is completed (the trigger condition has been met and sufficient events have been post-stored). If the trigger condition is not met or triggering is not enabled, this command will never terminate. Note that a running_save command can generate substantial quantities of data (the save file can grow very quickly).

run    Clear the event log and enable event logging. This command starts or restarts logging using the current limit and trigger conditions.

stop    Disable event logging. This command does not clear the current limit or trigger conditions.

reset    Restore SCSI event log to standard system boot operation. This command should be used when scsi_log will not be used for an extended period. This will cause both the core file and the hpux file to be changed.

on    Clear the event log and enable SCSI event logging. This command starts or restarts logging with no limit or trigger conditions.

off    Disable SCSI event logging. This command should be used to shutdown SCSI event logging.

limit = condition
    Log only events meeting the indicated condition. The condition must be either: NONE, ANY, or an event_specification as indicated below.

unlimit    Disable the current limit condition. This causes all events to be logged.

limit_points    Print the SCSI log points which could log events which might meet the current limit condition.

- 17 - trigger = condition
: Disable SCSI event logging when the indicated condition is met and all of the post-store events have been logged. The condition must be either: NONE, ANY, or an event_specification as indicated below.

untrigger
: Disable the current trigger condition. This command does not clear the current trigger condition.

trigger_points
: Print the SCSI log points which could log events which might meet the current trigger condition.

wait_for_trigger
: Wait until logging is stopped. This happens when a log run is completed (the trigger condition has been met and sufficient events have been post-stored). If the trigger condition is not met or triggering is not enabled this command will never terminate.

center_store
: Stop logging events after the trigger condition is met (post-store) such that the trigger event ends up in the center of the SCSI event log.

pre_store [= number_of_events ]
: Stop logging events after the trigger condition is met and the indicated number_of_events from before the trigger event (pre-store events) remain in the SCSI event log. If the number of events to pre-store is not specified, event logging will stop as soon as the trigger condition is met. This causes the entire log to be used to hold events which occurred before the trigger event.

post_store [ = number_of_events ]
: Stop logging events after the trigger condition is met and the indicated number_of_events after the trigger event (pre-store events) have been logged. Note that number_of_events may be larger than the total size of the SCSI event log. Such a number_of_events will cause the trigger event to be pushed out of the log. If the number of events to post-store is not specified, event logging will stop when the entire log is filled with events which occurred after the trigger event.

clock = clock_mode
: SCSI events are logged using one of two different system clocks. One of the clocks has high precision but low accuracy (it tends to drift). The other clock is very accurate but is relatively imprecise (its minimum interval is large). The high precision clock is generally used for events which occur a short time apart. The high accuracy clock is generally used for events which occur a long time apart. The clock_mode value indicates how to select between the system clocks when SCSI events are logged. Clock_mode must be one of the following values:

normal
  : Select between clocks to achieve a balance of precision and accuracy.

precise
  : Favor the high precision clock when possible. This clock_mode should be used to obtain maximally precise timing between successive events.

accurate
  : Favor the high accuracy clock when possible. This clock_mode should be used to obtain maximally accurate timing between events which are widely separated in time and/or event number.

log_size = number_of_events
: Change the SCSI event log size to the indicated number_of_events. This command changes the SCSI log size in the hpux file. A system reboot is required to cause the SCSI log size change to take effect.

trace
: Decode and print the current SCSI command trace condition. SCSI command tracing causes data to be stored in the kernel dmesg(1M) buffer. The dmesg(1M) command may be used to print this stored data. Note that SCSI command tracing is independent from SCSI event logging.

trace_on = trace_specification
Trace SCSI commands and command information meeting the specified trace_specification. Trace information may be accessed via dmesg(1M). The trace_specification must be a list of relational expressions surrounded by parenthesis and separated by the logical operator && (and). The following relational terms may appear in an event_specification :

device [ & dev_mask ] == dev_value
: The device associated with the SCSI command must equal dev_value after being bitwise anded with dev_mask. If no dev_mask is specified, the device associated with the SCSI command must exactly match dev_value.

major == dev_value
: The device associated with the SCSI command must have the major number indicated by dev_value.

dev == dev_value
: The device associated with the SCSI command must have the minor number indicated by dev_value.

lun == dev_value
: The device associated with the SCSI command must have the SCSI bus, target and LUN indicated by dev_value.

tgt == dev_value
: The device associated with the SCSI command must have the SCSI bus and target indicated by dev_value.

bus == dev_value
: The device associated with the SCSI command must have the SCSI bus indicated by dev_value.

dmesg_lines == dmesg_lines_value
: The trace information contained in the dmesg(1M) buffer lines indicated by dmesg_lines_value should be recorded.

Device values and masks and dmesg_lines values may be specified using multiple numeric and symbolic literals in a bitwise logical or expression using | operators. Device values and masks may also include device file names.

trace_off
: Discontinue tracing additional SCSI commands. Normally the SCSI I/O subsystem records only information associated with commands which unexpectedly fail. The trace_off command restores this system default operation.

- 19 -

An event_specification consists of a list of relational expressions surrounded by parenthesis and separated by the logical operators && (and) and || (or). Since the SCSI tracing uses a fixed and-or (sum of products) event_specification evaluation scheme, there is no need (nor support) for additional parenthesis imbeded within an event_specification. The following relational terms may appear in an event_specification :

device        [& dev_mask] == dev_value
                The device associated with the event must equal dev_value after being bitwise anded with dev_mask. If no dev_mask is specified, the device associated with the event must exactly match dev_value .

major == dev_value
                The device associated with the event must have the major number indicated by dev_value .

dev == dev_value
                The device associated with the event must have the minor number indicated by dev_value.

lun == dev_value
                The device associated with the event must have the SCSI bus, target and LUN indicated by dev_value.

tgt == dev_value
                The device associated with the event must have the SCSI bus and target indicated by dev_value.

bus == dev_value
                The device associated with the event must have the SCSI bus indicated by dev_value.

file == file_name
                The log point generating the event must be in the SCSI I/O subsystem source file indicated by file_name. This term also establishes the context for use of symbolic literals in successive terms separated by && operators.

routine == routine_name
                The log point generating the event must be in the SCSI I/O subsystem source subroutine indicated by routine_name. This term also establishes the context for use of symbolic literals in successive terms separated by && operators.

function == function_value
                The log point generating the event must be associated with the functional portion of the SCSI I/O subsystem indicated by function_name.

line == number [ thru number ]
                The log point generating the event must be at the indicated line number or in the indicated range of line numbers.

parameter == parameter_name
                The log point generating the event must reference the parameter name indicated by parameter_name.

parameter_name [ & value_mask ] relational_operator value

- 20 -

The log point generating the event must reference the parameter name indicated by parameter_name and the parameter value being logged must satisfy the indicated relational expression. Specifically, the result of bitwise anding the parameter value with value_mask must compare in the manner indicated by relational_operator with the value indicated by value. The relational_operator must be one of the following relation operators: == (equal), != (not equal), < (less than), > (greater than), <= (less than or equal to), or >= (greater than or equal to).

Value and value masks in relational terms may be specified using multiple numeric and symbolic literals in a bitwise logical or expression using | operators. Device values and device masks may also include device file names.

- 21 -

APPENDIX B -- A Preferred Sampling of Log Decoding Data

```
/* Minor number definitions (major number 121) */
#define M_NO_REW(dev)           ((dev) & 0x1)
#define M_UCB_MODE(dev)         ((dev) & 0x2)
#define M_DENSITY(dev)          (((dev) >> 2) & 0x3)
#define NUM_DENSITIES     4

/* Old minor definitions (major number 54) */
#define MO_UNBUFFERED(dev)   ((dev) & 0x04)
#define MO_FIXED_BLOCK(dev)  ((dev) & 0x08)
#define MO_PARTITION_ONE(dev)   ((dev) & 0x10)
#define MO_DENSITY(dev)         (((dev) >> 6) & 0x3)

/* Open flags for internal communication of old minor number bits. */
/* LOG_DATA_DEFINE("oflags", DATA_VALUE) */
#define F_UNBUFFERED            FDEFER
#define F_FIXED_BLOCK           FMARK
#define F_PARTITION_ONE         FAPPEND
/* LOG_DEFINE_END */

/* Convert from old minor number to new minor number */
#define M_DEV(dev) \
        makedev(st_ddsw.raw_major, \
                ((minor(dev) & ~0xFC) | (MO_DENSITY(dev) << 2)))

/* Device data which needs to stay arround between opens */
struct st_static_lun {
        struct st_static_lun *next;  /* link to find entry on open */
        u_short bus_id;              /* bus id of dev for search */
        u_char tgt_id;               /* target of dev for search */
        u_char lun_id;               /* lun of dev for search */
        u_int head_pos;              /* current head position */
        int open_block_size;         /* default block size */
        int open_unbuffered;         /* default write cache mode */
};

/* Head position definitions */
/* LOG_DATA_DEFINE("head", DATA_VALUE) */
#define AT_BOT       (GMT_BOT(~0))  /* begining of tape (medium) */
#define AT_EOT       (GMT_EOT(~0))  /* end of tape (medium) */
#define AT_FM        (GMT_EOF(~0))  /* just passed a filemark */
#define AT_SM        (GMT_SM(~0))   /* just passed a setmark */
#define AT_EOD       (GMT_EOD(~0))  /* end of data */
/* LOG_DEFINE_END */

/* Head reposition masks for clearing position bits */
#define HEAD_FORWARD    (AT_BOT | AT_FM | AT_SM)
#define HEAD_BACKWARD   (AT_EOT | AT_FM | AT_SM | AT_EOD)

/* Device data */
```

```
struct st_lun {
        struct st_type *type;              /* device type data */
        u_int state;                       /* temporal state data */
        struct st_static_lun *static_data; /* static state data */
        int block_size;                    /* current block size */
        int unbuffered;                    /* write cache is disabled */
        int data_resid;                    /* excess data not read */
        int part_xfer;                     /* partial data transfer */
};

/* State definitions */
/* LOG_DATA_DEFINE("state", DATA_VALUE) */
#define ST_ONLINE         0x00000001    /* medium is loaded and ready */
#define ST_CACHED_DATA    0x00000002    /* may require buf flush */
#define ST_NEEDS_MARKS    0x00000004    /* needs tape marks at close */
#define ST_EOT_INFORMED   0x00000008    /* EOT indicated with ENOSPC */
#define ST_EOT_ACKED      0x00000010    /* EOT ack'ed with MTIOCGET */
#define ST_PWR_FAILED     0x00000020    /* power fail or device reset */
#define ST_RD_ONLY        0x00000040    /* device opened read only */
#define ST_MED_CHANGED    0x00000080    /* medium has changed */
/* LOG_DEFINE_END */

/* Device configuration / control data */
struct st_type {
        char *vendor;                       /* vendor id */
        char *product;                      /* product id */
        u_int media;                        /* general media type */
        u_int mt_type;                      /* type for MTIOCGET ioctl */
        u_int block_size;                   /* default fixed block size */
        u_int close_marks;                  /* filemarks for rew close */
        u_int partitions;                   /* number of partitions */
        u_int characteristics;              /* functional characteristics */
        u_int density[NUM_DENSITIES];       /* minor num. density parms. */
};

/* Tape media types */
/* LOG_DATA_DEFINE("media", ~0) */
#define TM_UNKNOWN   0    /* Media type is unknown */
#define TM_REEL      1    /* 1/2" reel-to-reel */
#define TM_DAT       2    /* DAT DDS cartridge */
#define TM_8MM       3    /* 8mm video cartridge */
#define TM_QIC       4    /* 1/4" cartridge */
/* LOG_DEFINE_END */

/* Tape device characteristics */
/* LOG_DATA_DEFINE("characteristics", DATA_VALUE) */
#define CR_NO_SETMARKS    0x00000001    /* Does not support setmarks */
#define CR_BOT_8MM        0x00000002    /* BOT notation unusual */
#define CR_CAP_LOG_31     0x00000004    /* Capacity info in log pg 31 */
#define CR_CAP_8MM        0x00000008    /* Capacity info in sense data */
#define CR_ERR_LOG_2_HP   0x00000010    /* Error info in log pg 2 */
#define CR_ERR_LOG_2      0x00000020    /* Error info in log pg 2 */
```

- 23 -

```
#define CR_ERR_8MM          0x00000040    /* Error info in sense data */
#define CR_ERR_VIPER 0x00000080    /* Error info in sense data */
#define CR_NO_RD_POS 0x00000100    /* Bad support for read pos. */
#define CR_NO_RQ_BLK        0x00000200    /* Bad support for req. blk. */
#define CR_NO_SEEK_BLK      0x00000400    /* Bad support for seek blk */
#define CR_NO_LOCATE        0x00000800    /* Bad support for locate */
#define CR_ERR_WANG_QIC     0x00001000    /* Error info in sense data */
#define CR_MED_WANG_QIC     0x00002000    /* Media type in sense data */
#define CR_SEN_WANG_QIC     0x00004000    /* BOT notation unusual */
#define CR_IMMED_WR_FM      0x00008000    /* Immediate FM writing can be used*/
#define CR_SCSI2_SENSE      0x80000000    /* SCSI2 sense but id's SCSI1 */
/* LOG_DEFINE_END */

/* Density control values */
/* LOG_DATA_DEFINE("density", DATA_VALUE) */
#define DEN_FAIL            0x80000000
#define DEN_CURR            0x40000000
#define DEN_COMP            0x20000000
#define DEN_UNCOMP          0x10000000
#define DEN_COMP_ERR_OK     0x08000000
#define DEN_CODE_ERR_OK     0x04000000
/* LOG_DEFINE_END */ define DEN_CODE_MASK       0x000000FF

/* SCSI density codes */
/* LOG_DATA_DEFINE("density", DEN_CODE_MASK) */
#define DEN_800BPI      0x01
#define DEN_1600BPI     0x02
#define DEN_6250BPI     0x03
#define DEN_QIC11       0x04
#define DEN_QIC24       0x05
#define DEN_QIC120      0x0f
#define DEN_QIC150      0x10
#define DEN_QIC525      0x11
#define DEN_QIC1350     0x12
#define DEN_DDS         0x13

/* Vendor specific density codes */
#define DEN_QICBEST         0x00
#define DEN_EXA8500_DFT     0x00    /* This is for 8500 density with a 8500 drive */
#define DEN_EXA8200         0x14    /* 8mm 8200 mode */
#define DEN_EXA8500         0x15    /* 8mm 8500 mode */
#define DEN_EXA8200C 0x90   /* 8mm 8200 mode with data compression */
#define DEN_EXA8500C 0x8c/  * 8mm 8500 mode with data compression */
#define DEN_ARCHIVE_DDS     0x14    /* ??? */
/* LOG_DEFINE_END */

/* Definitions for read and write commands */
#define FIXED           0x01    /* Fixed block size */

/* Definitions for load commands */
```

HP CASE #1094008

- 24 -

```
        /* LOG_DATA_DEFINE("load_op", ~0) */
        #define UNLOAD          0x00
        #define LOAD            0x01
        /* LOG_DEFINE_END */
5
        /* Definitions for space commands (also used for write filemarks) */
        /* LOG_DATA_DEFINE("mark_type", ~0) */
        #define RECORD               0x00
        #define FILEMARK             0x01
10      #define SETMARK              0x04
        #define END_OF_DATA  0x03
        /* LOG_DEFINE_END */

/* Definitions for read position commands */
15      #define POS_UNKNOWN     0x04

/* Type definitions for log page types */
        #define CURRENT_LOG  0x40    /* Current parameter values */

20      /* Definitions for mode headers */
        #define HD_BUF_MASK  0x70    /* Write buffering mask */
        #define HD_BUF_SHIFT  4      /* Write buffering shift */

/* Structure for mode page 0x0F (data compression control) */
25      struct mode_page_0F {
                unsigned char   page_code;
                unsigned char   page_len;
                unsigned char   comp_cntl;
                unsigned char   decomp_cntl;
30              unsigned char   comp_alg[4];
                unsigned char   decomp_alg[4];
                unsigned char   reserved[4];
        };

35      /* Definitions for mode page 0x0F (data compression control) */
        /* LOG_DATA_DEFINE("comp_cntl", DATA_VALUE) */
        #define PD_DCE       0x80    /* data compression enable */
        #define PD_DCC       0x40    /* data compression capable */
        /* LOG_DEFINE_END */
40      /* LOG_DATA_DEFINE("decomp_cntl", DATA_VALUE) */
        #define PD_DDE       0x80    /* data decompression enable */
        /* LOG_DEFINE_END */
        #define PD_RED_MASK  0x60    /* report exception enable mask */
        /* LOG_DATA_DEFINE("decomp_cntl", PD_RED_MASK) */
45      #define PD_RED_ONE       0x20   /* RED = 1, detect compress alg. chg. */
        /* LOG_DEFINE_END */

/* Structure for mode page 0x10 (device configuration) */
        struct mode_page_10 {
50              unsigned char   page_code;
                unsigned char   page_len;
                unsigned char   mode_cntl;
```

- 25 -

```
              unsigned char   active_part;
              unsigned char   write_buf_ratio;
              unsigned char   read_buf_ratio;
              unsigned char   write_delay[2];
5             unsigned char   EW_cntl;
              unsigned char   gap_size;
              unsigned char   EOD_cntl;
              unsigned char   buf_size[3];
              unsigned char   comp_alg;
10            unsigned char   reserved;
          };

/* Definitions for mode page 0x10 (device configuration) */
          #define PD_CAP        0x40    /* change active partition */
15
          /* Generic device class for MTIOCGET mt_dsreg2 */
          /* LOG_DATA_DEFINE("mt_dsreg2", 0x0000000f) */
          #define SCSI_SM              0x2
          #define SCSI_SM_PART         0x4
20        #define SCSI_SM_DC           0x5
          #define SCSI_SM_PART_DC      0x6
          #define SCSI_QIC             0x7
          #define SCSI_QIC_DC          0x8
          #define SCSI                 0x9
25        /* LOG_DEFINE_END */

/* Functional classes for logging */
          /* LOG_DATA_DEFINE("function", DATA_VALUE) */
          #define OPEN_CLOSE    0x01
30        #define READ_WRITE    0x02
          #define CONFIG 0x04
          #define POSITION      0x08
          #define CONDITION     0x10
          /* LOG_DEFINE_END */
35
```

I claim:

1. A software logic analyzer for aiding an end-user in the analysis of software problems occurring in a software process residing in a computer system, the analyzer comprising:

an event log;

a kernel log machine, the kernel log machine collects at least one predetermined log point located within the software process, the kernel log machine places said at least one predetermined log point in the event log;

a kernel log machine interface, connected to the kernel log machine, the interface provides the end-user a capability to control the kernel log machine;

decoding means for transforming the event log from a first format to a second format; and a cross-trigger port having first and second ends, the first end connected to the kernel log machine, the second end connected to an external analyzer.

2. The software logic analyzer as recited in claim 1, wherein the cross-trigger port is bi-directional.

3. The software logic analyzer as recited in claim 2, wherein the cross-trigger port resides within an I/O interface of the computer system.

4. The software logic analyzer as recited in claim 3, wherein the cross-trigger port can be configured as a trigger input port, the trigger input port providing the external analyzer a capability to arm the software logic analyzer.

5. The software logic analyzer as recited in claim 3, wherein the cross-trigger port can be configured as a trigger input port, the trigger input port providing the external analyzer a capability to trigger the software logic analyzer.

6. The software logic analyzer as recited in claim 3, wherein the cross-trigger port can be configured as a trigger output port, the trigger output port providing the software logic analyzer a capability to send a message to the external analyzer.

7. The software logic analyzer as recited in claim 3, wherein the external logic analyzer is a hardware logic analyzer.

8. The software logic analyzer as recited in claim 3, wherein the external logic analyzer is an oscilloscope.

9. The software logic analyzer as recited in claim 3, wherein the kernel log machine is located in a first area of memory, the first area being inaccessible by the end-user.

10. The software logic analyzer as recited in claim 9, wherein the I/O interface comprises a SCSI interface.

11. The software logic analyzer as recited in claim 10, wherein the SCSI drive is controlled by the software process, the at least one predetermined log point indicative of a sub-process of the SCSI interface.

12. A method for software logic analysis of problems occurring in a software process, the method comprising the steps of:

(a) starting an analyzer function to collect data located in the software process upon encountering a predetermined log point located within the software process, the analyzer function having an operation state;

(b) determining whether an external trigger condition has been satisfied; and (c) saving a first predetermined log point in an event log when the external trigger condition is satisfied.

13. The method as recited in claim 12, wherein step (b) further comprises the steps of:

(b1) determining whether the operation state is equal to ARMED;

(b2) determining, if the operation state is equal to ARMED, whether the external trigger condition has been satisfied; and (b3) resetting the operation state equal to NOT_ARMED if the external trigger condition has been satisfied.

14. The method as recited in claim 13, further comprising the steps of:

(d) determining, if the operation state is not equal to ARMED after step (b1), whether an internal trigger condition is present;

(e) determining, if the internal trigger condition is present, whether the internal trigger condition has been satisfied;

(f) setting the operation state of the analyzer function equal to TRIGGERED if the internal trigger condition has been satisfied;

(g) saving a second predetermined log point in an event log.

* * * * *